(12) United States Patent
Li et al.

(10) Patent No.: US 10,355,585 B2
(45) Date of Patent: Jul. 16, 2019

(54) VARIABLE FREQUENCY DRIVE CIRCUIT WITH OVERVOLTAGE PROTECTION

(71) Applicant: Eaton Corporation, Cleveland, OH (US)

(72) Inventors: Huaqiang Li, Menomonee Falls, WI (US); Youdong He, Shenzhen (CN); Xiaoling Li, Shenzhen (CN)

(73) Assignee: Eaton Intelligent Power Limited, Dublin (IE)

( * ) Notice: Subject to any disclaimer, the term of this patent is extended or adjusted under 35 U.S.C. 154(b) by 658 days.

(21) Appl. No.: 14/656,049

(22) Filed: Mar. 12, 2015

(65) Prior Publication Data
US 2016/0268797 A1    Sep. 15, 2016

(51) Int. Cl.
| | | |
|---|---|---|
| *H02M 1/32* | (2007.01) | |
| *H02M 5/458* | (2006.01) | |
| *H02M 1/44* | (2007.01) | |
| *H02M 1/36* | (2007.01) | |
| *H02H 7/125* | (2006.01) | |
| *H02M 7/06* | (2006.01) | |

(Continued)

(52) U.S. Cl.
CPC ............ *H02M 1/44* (2013.01); *H02H 7/1252* (2013.01); *H02M 1/32* (2013.01); *H02M 1/36* (2013.01); *H02M 5/458* (2013.01); *H02M 5/4585* (2013.01); *H02M 7/06* (2013.01); *H02M 7/062* (2013.01); *H02M 7/125* (2013.01); *H02M 7/162* (2013.01)

(58) Field of Classification Search
CPC ............ H02M 1/32; H02M 1/36; H02M 1/44; H02M 1/125; H02M 1/162; H02H 3/20
See application file for complete search history.

(56) References Cited

U.S. PATENT DOCUMENTS 3,973,169 A * 8/1976 Titus .................... H02H 7/16
324/127
5,513,058 A * 4/1996 Hollenbeck .......... H02H 7/1216
318/400.13

(Continued)

OTHER PUBLICATIONS

"Guidance Notes on Control of Harmonics in Electrical Power Systems," American Bureau of Shipping, May 2006.

(Continued)

*Primary Examiner* — Jue Zhang
*Assistant Examiner* — David A. Singh
(74) *Attorney, Agent, or Firm* — Ziolkowski Patent Solutions Group, SC (57) ABSTRACT

A variable frequency drive (VFD) circuit includes an input connectable to an AC source, a rectifier to convert an AC power input to a DC power, a DC link to receive DC power from the rectifier and having a DC link voltage thereon, a DC link capacitor bank with one or more capacitors connected to the DC link, and a pre-charge circuit coupled to the DC link capacitor. The pre-charge circuit further includes one or more resistors, one or more pre-charge relays each operable in on and off states to selectively control a current flow through the resistor(s) so as to control an initial pre-charge of the DC link capacitor, and an overvoltage relay operable in on and off states to selectively cut-off a current flow to the DC link capacitor bank, so as to prevent an overvoltage condition in the DC link capacitor bank.

20 Claims, 8 Drawing Sheets

(51) Int. Cl.
*H02M 7/12* (2006.01)
*H02M 7/162* (2006.01)

(56) References Cited

U.S. PATENT DOCUMENTS

| | | | | |
|---|---|---|---|---|
| 6,069,811 | A * | 5/2000 | Moriguchi | H02H 7/1257 363/142 |
| 2003/0063481 | A1* | 4/2003 | Kojori | H02M 1/36 363/49 |
| 2010/0066288 | A1* | 3/2010 | Williams | B60L 11/1803 318/434 |
| 2011/0007530 | A1* | 1/2011 | Swamy | H02M 1/36 363/37 |
| 2013/0050890 | A1* | 2/2013 | Rozman | H03K 17/082 361/90 |
| 2013/0234675 | A1* | 9/2013 | King | B60L 11/1814 320/163 |
| 2015/0098258 | A1* | 4/2015 | Park | H02M 5/4585 363/37 |
| 2015/0138849 | A1* | 5/2015 | Bae | H02M 5/458 363/37 |
| 2015/0311695 | A1* | 10/2015 | West | H02P 27/06 361/33 |

OTHER PUBLICATIONS

Evans et al., "The Price of Poor Power Quality," American Association of Drilling Engineers, AADE-11-NTCE-7, 2011, pp. 1-17.
Hoevenaars et al., "Preventing AC Drive Failures Due to Commutation Notches on A Drilling Rig," IEEE PCIC-2009, Sep. 2007, pp. 1-6.
Ghandehari et al., "Evaluating Voltage Notch Problems Arising from AC/DC Converter Operation," IEEE Transactions on Power Electronics, vol. 24, No. 9, Sep. 2009, pp. 2111-2119.
Hoevenaars et al., "Design Considerations When Applying Various LV ASD Topologies to Meet Harmonic Compliance," IEEE Transactions on Industry Applications, vol. 47, No. 4, Jul./Aug. 2011, pp. 1578-1585.

* cited by examiner

VARIABLE FREQUENCY DRIVE CIRCUIT WITH OVERVOLTAGE PROTECTION

BACKGROUND OF THE INVENTION

The present invention relates generally to variable frequency drive circuits and, more particularly, to variable frequency drive circuits with overvoltage protection.

Figure 1:
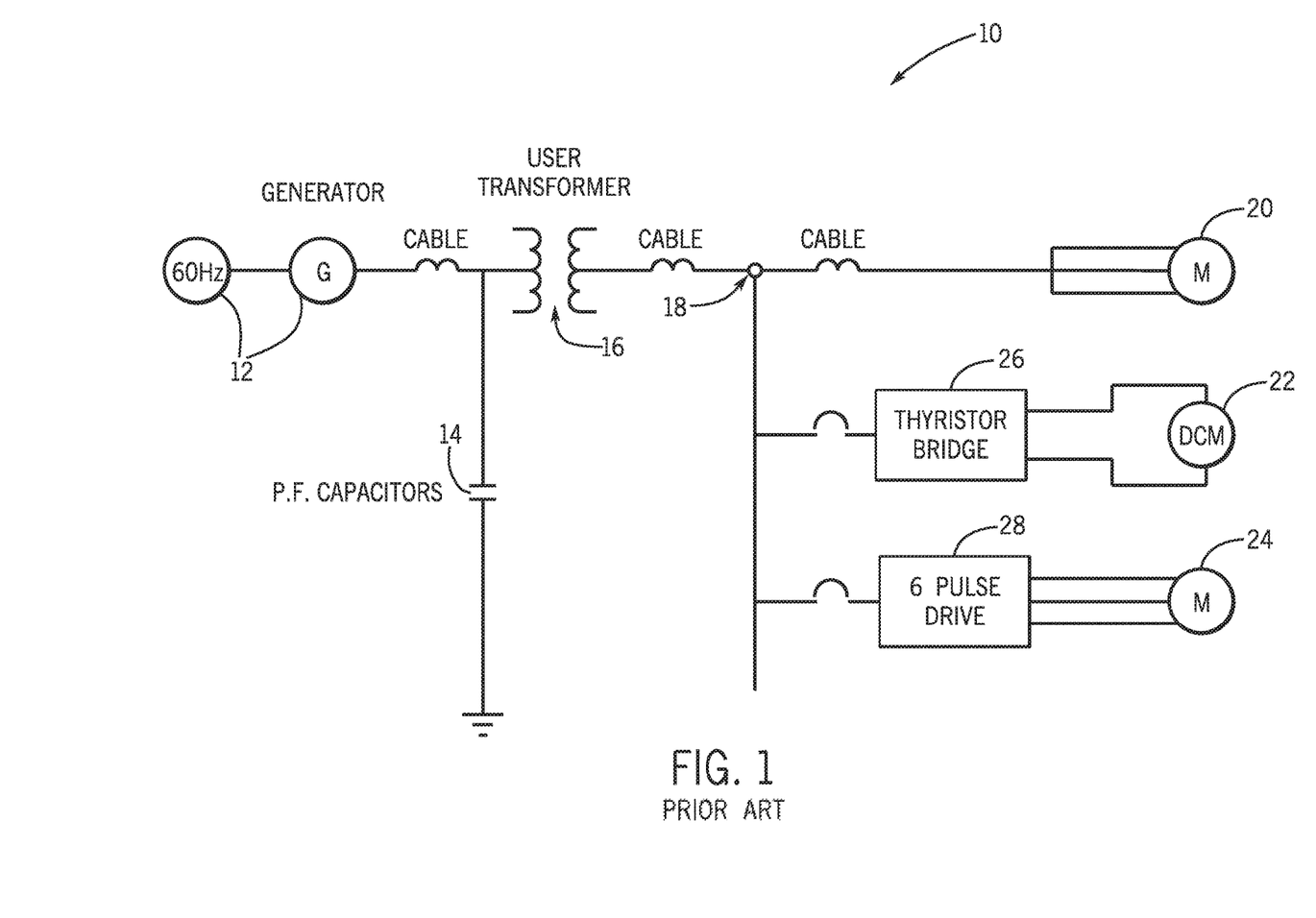
FIG. 1 is a schematic diagram of a system with a VFD circuit for land and offshore drilling rigs, as known in the prior art.

One type of system commonly used in industry that performs power conversion is an adjustable or variable frequency drive (VFD) circuit, which is an industrial control device that provides for variable frequency, variable voltage operation of a driven system, such as an AC induction motor. One operating environment in which such VFD circuits are commonly used is in on-land and offshore drilling rigs. FIG. 1 shows an example of a such a drilling rig system 10, with the system including a 60 Hz diesel generator 12, power factor capacitors 14 coupled to the 60 Hz diesel generator 12, and a user transformer 16 coupled to the 60 Hz diesel generator 12 and the power factor capacitors 14—with the generator 12 and transformer 16 collectively providing power for the system 10. An output of the transformer 16 is provided to a point of common coupling 18 to which a number of loads are connected. For example, an AC motor 20, DC motor 22 and AC motor 24 are included in the system 10, with a thyristor bridge 26 being provided between the common coupling 18 and the DC motor 22 and a six-pulse VFD circuit 28 connected between the common coupling 18 and the AC motor 24.

Figure 2:
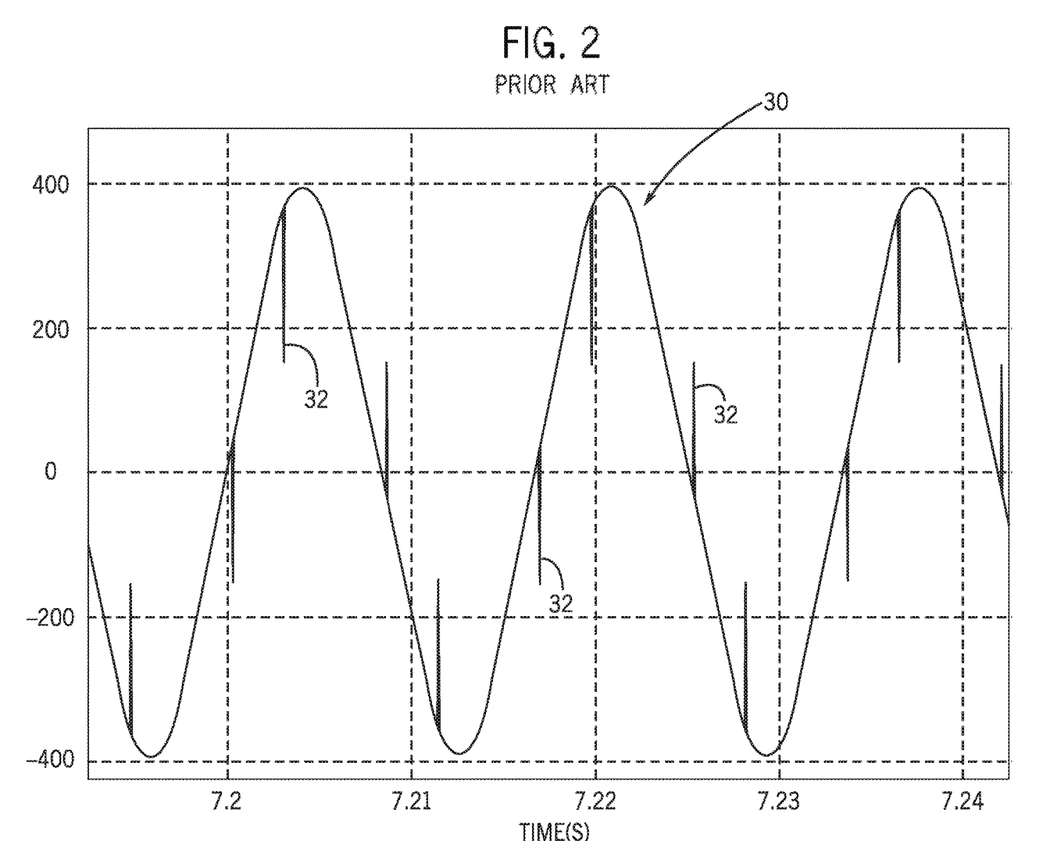
FIG. 2 is a waveform of one phase of a 3-phase power provided from a power source in the system of FIG. 1, with the power including voltage notches therein.
Figure 3:
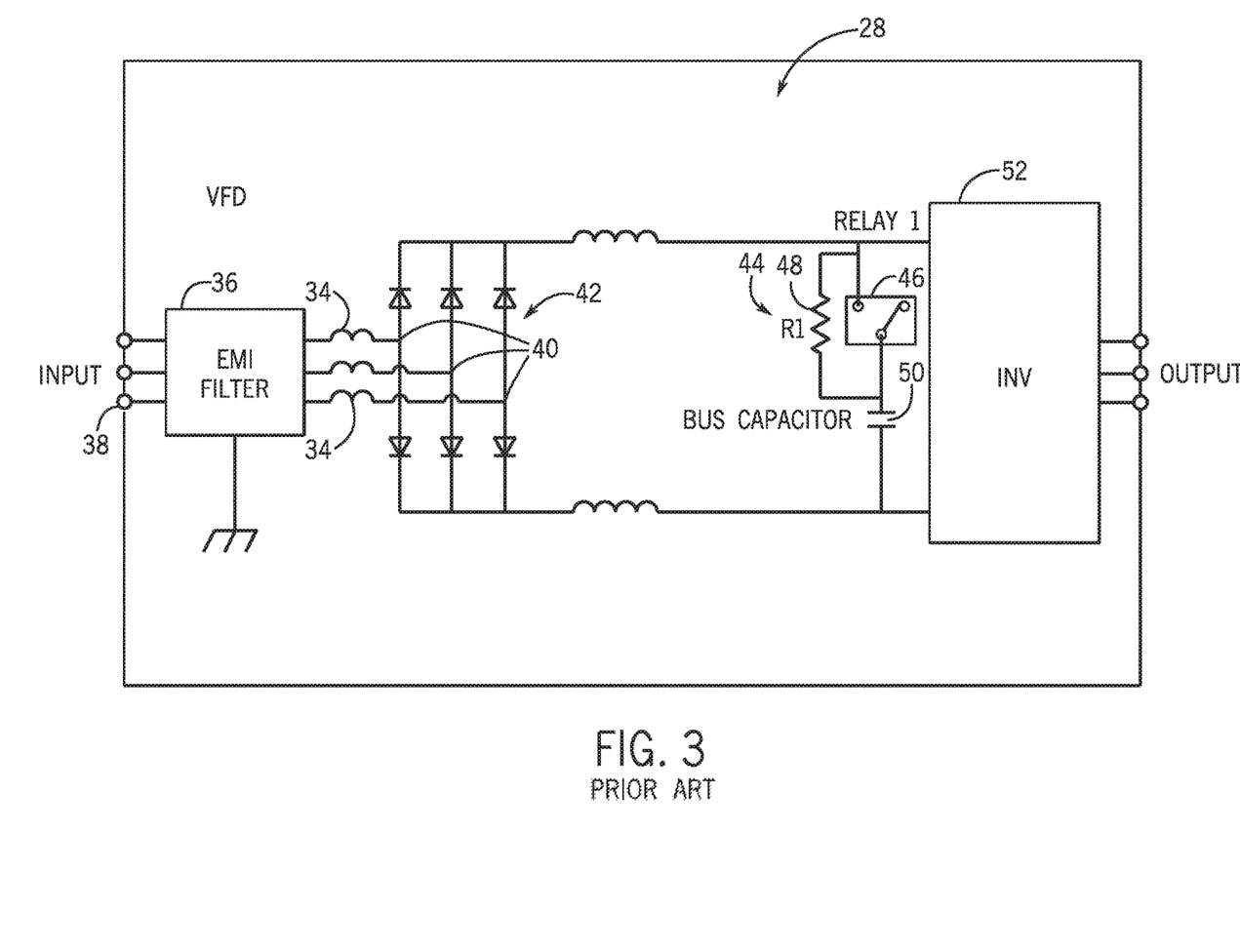
FIGS. 3 and 4 are schematic diagrams of VFD circuits useable in the system of FIG. 1, as known in the prior art.
Figure 4:
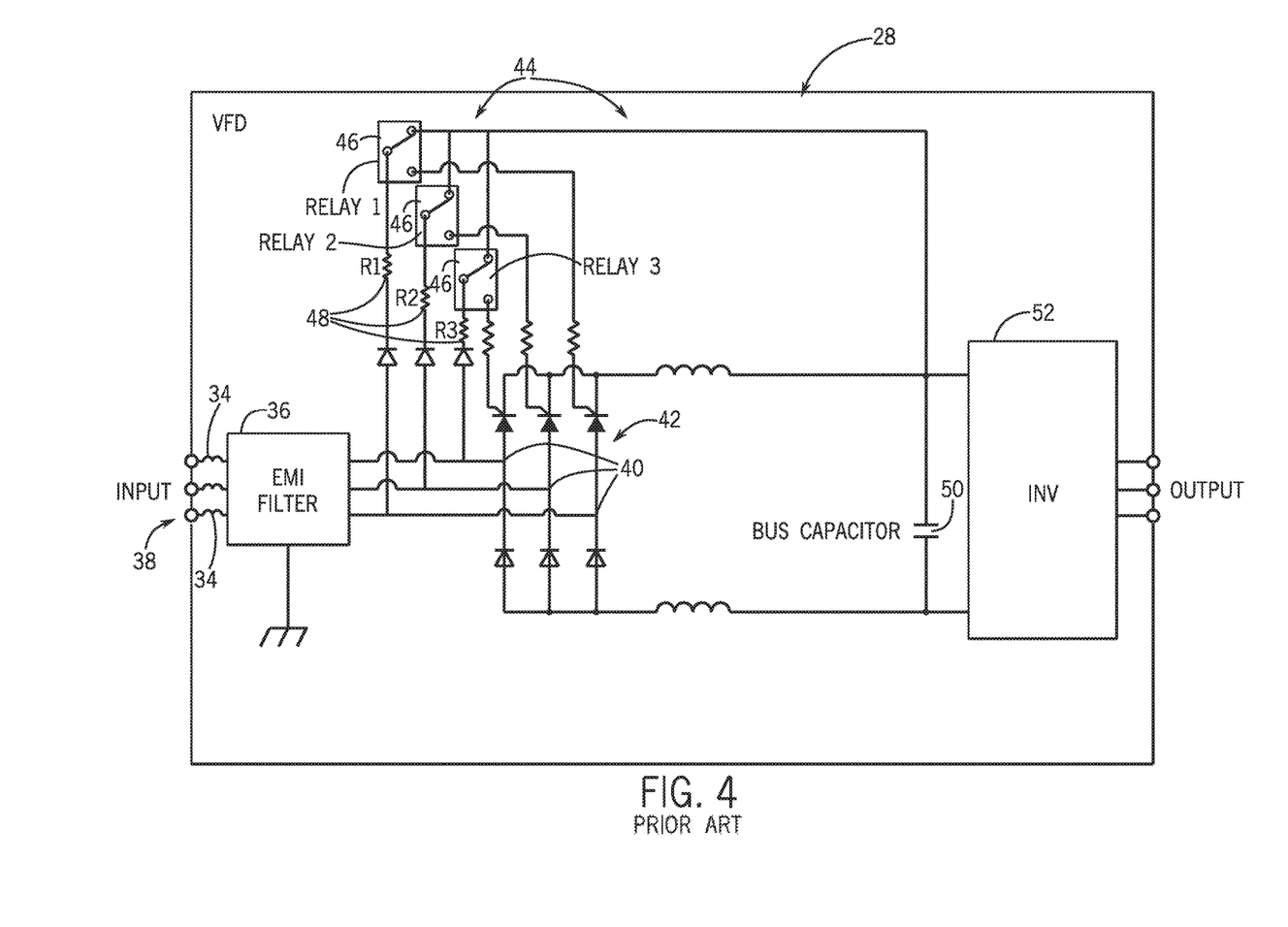

It is recognized that the 60 Hz diesel generator 12 in the drilling rig system 10 is a "weak source" with a high impedance—such that the power provided to the point of common coupling 18 therefrom includes deep voltage notches, with these voltage notches at the common coupling 18 being illustrated in the waveform 30 of FIG. 2—i.e., voltage notches 32. These deep voltage notches at the point of common coupling 18—which is an input to the VFD circuit 28—may cause performance issues and component failures in the VFD circuit. To better illustrate these drawbacks, a number of typical VFD circuits 28 are illustrated in FIGS. 3 and 4—with the VFD circuits 28 including built-in or external AC input inductors 34 and electromagnetic interference (EMI) filters 36 provided between a drive input 38 and input rectifier terminals 40, a rectifier 42, a pre-charge circuit 44 including one or more relays 46 and a resistor or resistors 48, a DC link capacitor bank which may consist of one or more capacitors 50, and an inverter 52. In operation of these VFD circuits 28, the deep voltage notches 32 (FIG. 2) present in the input power provided thereto (from the "weak" power source—generator 12/transformer 16) may cause overvoltage ringing at the input rectifier terminals 40. The overvoltage ringing can cause the DC link capacitors 50 in the VFD circuit 28 to fail due to overvoltages charging the DC link capacitors 50 in an uncontrolled manner with high frequency ripple.

While solutions exist presently for addressing the problem of overvoltage ringing and associated DC link capacitor failure, these are limited to adding notch reactors at VFD circuit inputs or removing EMI filters. Each of these solutions, however, has drawbacks associated therewith—as adding notch reactors at VFD circuit inputs is expensive space consuming (i.e., the notch reactors are large) and removing EMI filters results in only a limited degree of protection being provided to the VFD circuit.

It would therefore be desirable to design a VFD circuit with a smaller and more cost effective solution for overvoltage protection.

BRIEF DESCRIPTION

Embodiments of the present invention provide VFD circuits with overvoltage protection. The overvoltage protection may be implemented with an overvoltage relay in pre-charge circuits implemented in the VFD circuits.

In accordance with one aspect of the invention, a VFD circuit includes an input connectable to an AC source, a rectifier connected to the input to convert an AC power input to a DC power, a DC link coupled to the rectifier to receive the DC power therefrom, the DC link having a DC link voltage thereon, a DC link capacitor bank comprising one or more capacitors connected to the DC link to smooth the DC link voltage, and a pre-charge circuit coupled to the DC link capacitor bank. The pre-charge circuit further includes one or more resistors, one or more pre-charge relays each operable in an on and off state to selectively control a current flow through the one or more resistors so as to control an initial pre-charge of the DC link capacitor bank, and an overvoltage relay operable in an on and off state to selectively cut-off a current flow to the DC link capacitor bank, so as to prevent an overvoltage condition in the DC link capacitor bank.

In accordance with another aspect of the invention, a method of operating a VFD circuit that includes a rectifier, a DC link having a DC link capacitor with one or more capacitors thereon, a pre-charge circuit, and an inverter is provided. The method includes receiving an AC power at an input of the VFD circuit and providing the AC power to the rectifier to covert the AC power to a DC power on the DC link, with the DC power comprising a DC voltage. The method also includes measuring the DC voltage via one or more voltage sensors on the DC link and comparing the measured DC voltage to a list of defined voltage conditions in order to identify a voltage condition on the DC link, the voltage conditions including an undervoltage condition, an overvoltage condition, and a normal voltage condition. The method further includes controlling the pre-charge circuit based on the identified voltage condition, wherein controlling the pre-charge circuit comprises selectively operating one or more pre-charge relays in the pre-charge circuit in an on state or an off state to control an initial pre-charge of the DC link capacitor bank and selectively operating an overvoltage relay in the pre-charge circuit in an on state or an off state to prevent an overvoltage condition in the DC link capacitor bank.

In accordance with yet another aspect of the invention, a VFD circuit includes a rectifier, a DC link coupled to the rectifier to receive a DC link voltage therefrom and having a DC link capacitor bank thereon that includes one or more capacitors, a pre-charge and protection circuit coupled to the DC link capacitor bank via the DC link and configured to control an initial pre-charge of the DC link capacitor bank and provide overvoltage protection to the DC link capacitor bank, and a controller in operable communication with the pre-charge and protection circuit. The controller is configured to receive an input from one or more voltage sensors regarding a measured DC link voltage and compare the measured DC link voltage to a number of defined voltage conditions in order to identify a voltage condition on the DC link, the defined voltage conditions comprising an undervoltage condition, an overvoltage condition and a normal voltage condition. The controller is further configured to control the pre-charge circuit based on the identified voltage condition so as to selectively provide for an initial pre-charge of the DC link capacitor bank and provide overvoltage protection to the DC link capacitor bank.

Various other features and advantages of the present invention will be made apparent from the following detailed description and the drawings.

BRIEF DESCRIPTION OF THE DRAWINGS

The drawings illustrate preferred embodiments presently contemplated for carrying out the invention.

In the drawings.

DETAILED DESCRIPTION

Embodiments of the invention are directed to VFD circuits including an overvoltage protection relay. The overvoltage protection relay of the VFD circuits is a smaller and more cost effective solution for overvoltage protection than previous solutions for overvoltage protection.

Figure 5:
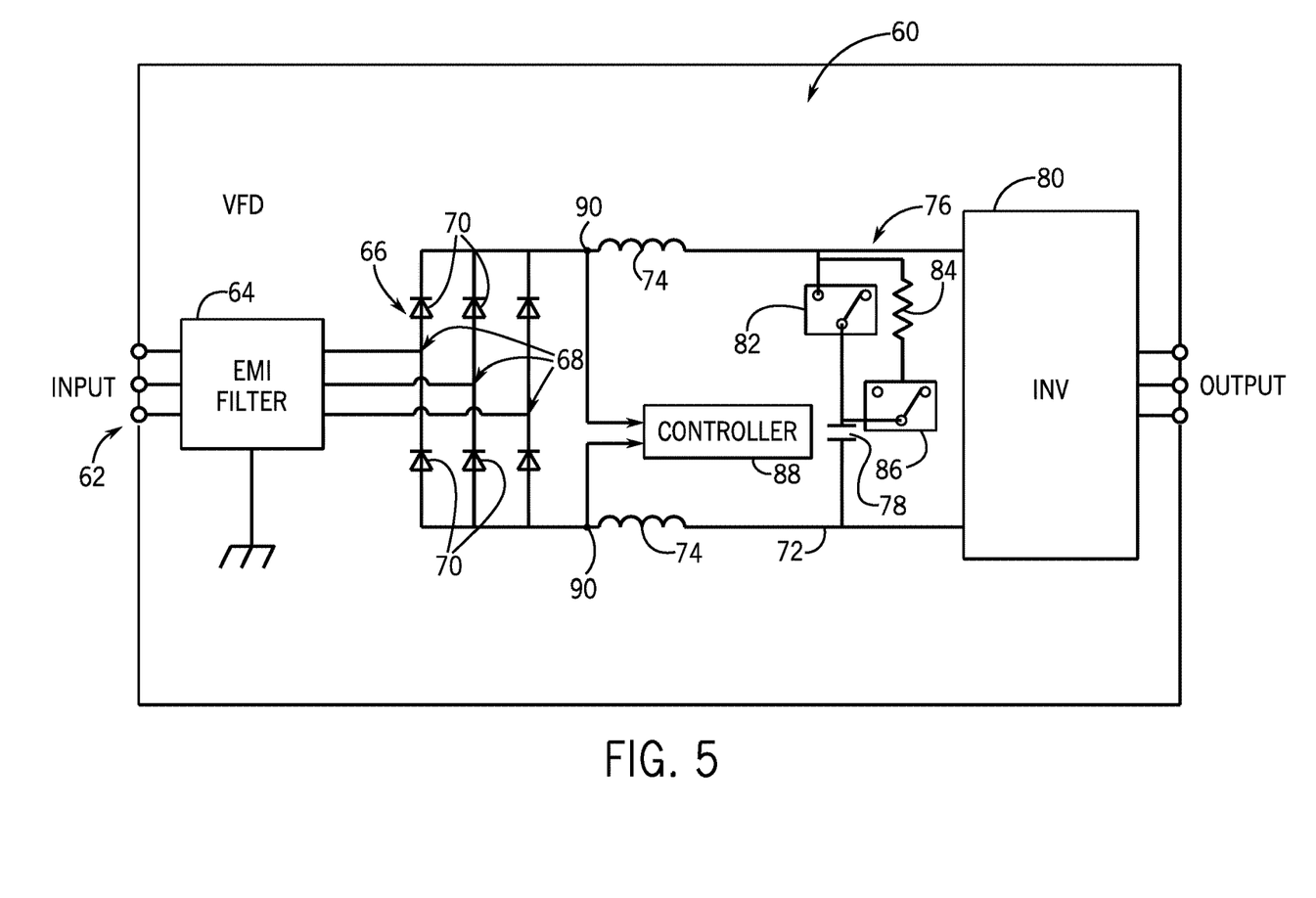
FIG. 5 is a schematic diagram of a VFD circuit according to an embodiment of the invention.

Referring to FIG. 5, a VFD circuit 60 including overvoltage protection is shown according to one embodiment of the invention, with the VFD circuit 60 having one potential implementation with the system 10 of FIG. 1, i.e., replacing VFD circuit 28, for example. The VFD circuit 60 includes an input 62 connectable to a three-phase AC source (not shown), such as the generator 12 and transformer 16 of the system 10 of FIG. 1. The input 62 provides power to an electromagnetic interference (EMI) filter 64 that removes EMI from the AC input power, with the filtered power being provided to a three-phase rectifier bridge 66 at input rectifier terminals 68. The three-phase rectifier bridge 66 includes an arrangement of six diodes 70 that function to convert the AC power input to a DC power, such that a DC link voltage is provided to a DC link 72. Inductors 74 are coupled in series with and on either side of the rectifier bridge 66, with one of the inductors being coupled in series with a pre-charge circuit 76 (or "pre-charge and protection circuit") that functions to control and limit the magnitude of an inrush current into a DC link capacitor bank 78 (i.e., that may be comprised of one or more capacitors) during power-up of the VFD circuit 60. The DC link capacitor bank 78 provides smoothing to the DC link voltage, with this smoothed voltage then being provided to an inverter 80. The inverter 80 is composed of a series of IGBT switches and anti-parallel diodes (not shown) that collectively form a PWM inverter that synthesizes AC voltage waveforms with a variable frequency and amplitude for delivery to a load (e.g., AC motor of FIG. 1).

The pre-charge circuit 76 includes a pre-charge relay 82 in parallel with a resistor 84, with the pre-charge relay 82 controlling a current flow through the resistor 84 so as to control an initial pre-charge of the DC link capacitor bank 78. According to an exemplary embodiment, the pre-charge circuit 76 also includes an overvoltage relay 86 that is provided to prevent failure of the DC link capacitor bank 78, with the overvoltage relay 86 coupled in series with the resistor 84 such that the overvoltage relay 86 and resistor 84 are in parallel with the pre-charge relay 82. In operation, the pre-charge circuit 76—i.e., the pre-charge relay 82 and overvoltage relay 86 therein—can be selectively controlled in order to control an initial pre-charge of the DC link capacitor bank 78 and cut-off a current flow to the DC link capacitor bank 78 so as to prevent an overvoltage condition in the DC link capacitor bank, with the relays 82, 86 allowing current flow therethrough when in an "On" state/position and not allowing current flow therethrough when in an "Off" state/position.

In order to provide for controlling of the pre-charge circuit 76, a controller 88 is provided in VFD circuit 60 that is in operable communication with the pre-charge circuit 76. The controller 88 may comprise a VFD circuit controller that also controls operation of the inverter 80 or may be a separate dedicated controller that just controls operation of the pre-charge circuit 76. In controlling operation of pre-charge circuit 76, the controller 88 receives an input from one or more voltage sensors 90 provided on the DC link 72 that measure the DC link voltage thereon. Based on values of the DC link voltage provided from sensors 90, the controller 88 then controls switching of each of the pre-charge relay 82 and the overvoltage relay 86 between an On state and an Off state, such that current through the pre-charge circuit 76 can be selectively controlled.

In controlling operation of the pre-charge relay 82 and the overvoltage relay 86, the controller 88 compares the DC link voltage, as measured by voltage sensors 90, to a number of pre-defined "conditions" or "states" in which the VFD circuit may currently be operating. In an exemplary embodiment, the controller 88 compares the DC link voltage to a pre-defined "Overvoltage Condition," "Undervoltage Condition" (i.e., "Pre-Charge Condition") and "Normal Voltage Condition"—with it being understood that each of these conditions may encompass a pre-defined voltage or voltage range that the measured DC link voltage may fall within. In a simplest embodiment, the DC link voltage may be compared to a "normal voltage" value, with it being determined that: an Overvoltage Condition exists if the DC link voltage is greater than the normal voltage, an Undervoltage Condition exists if the DC link voltage is less than the normal voltage, and a Normal Condition exists if the DC link voltage is equal to the normal voltage.

The operating states of the pre-charge relay 82 and the overvoltage relay 86—as determined by the comparison of the DC link voltage to the pre-defined voltage conditions performed by controller 88—will now be described. When the pre-charge relay 82 and the overvoltage relay 86 are both in the Off state ("Overvoltage Condition"), the DC link 72 does not provide power to the DC link capacitor bank 78 to remove or prevent an overvoltage condition. When the pre-charge relay 82 is in the Off state and the overvoltage relay 86 is in the On state ("Undervoltage/Pre-Charge Condition"), the DC link 72 provides power to the DC link capacitor bank 78 through the resistor 84 during a pre-charge condition (for example, start up). When the pre-charge relay 82 is in the On state and the overvoltage relay 86 is in either the On or Off state ("Normal Condition"), the DC link 72 provides power directly to the DC link capacitor bank 78 during a normal operation condition. Operation of the pre-charge circuit 76 is explained in greater detail in the technique illustrated in FIG. 7.

Figure 6:
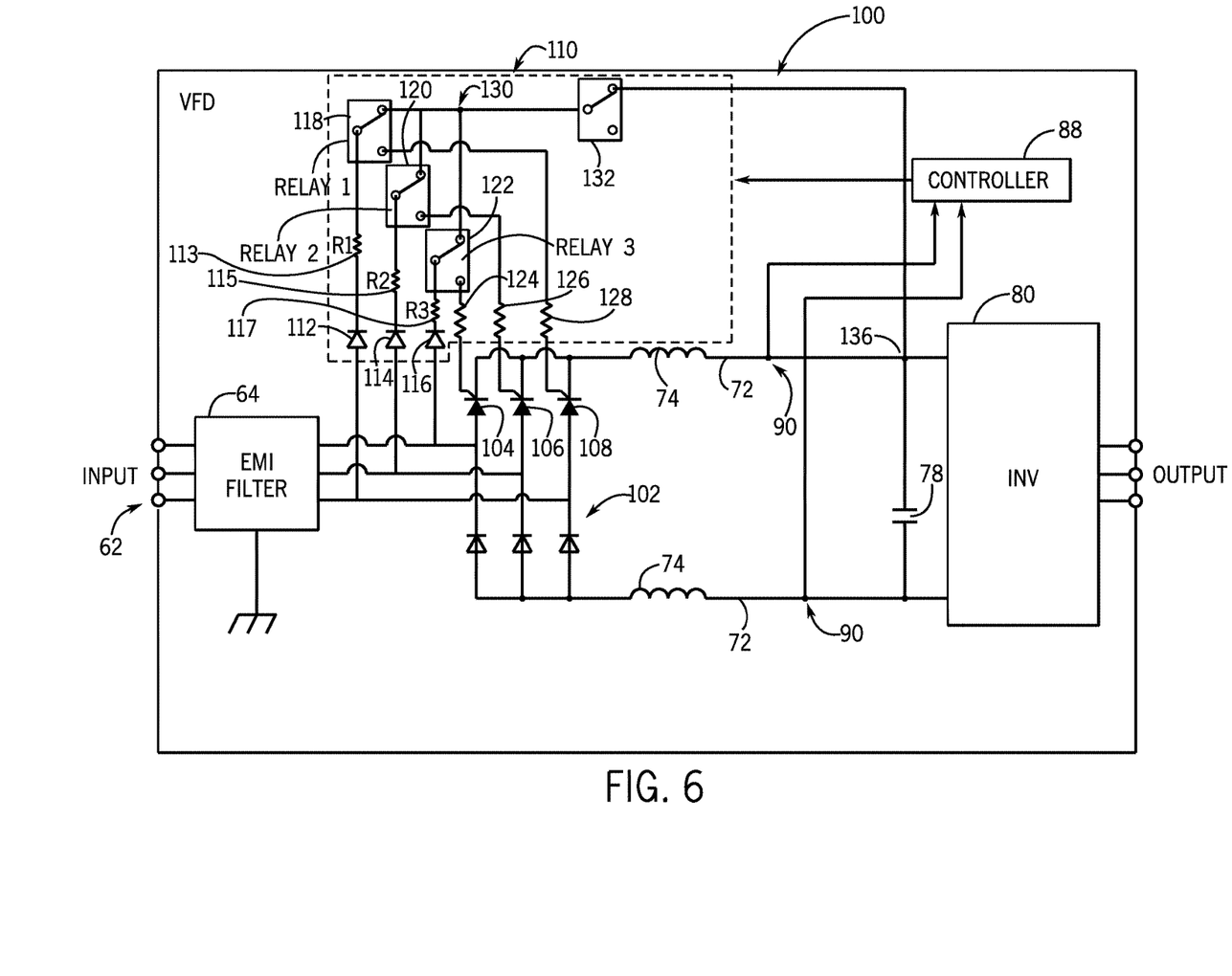
FIG. 6 is a schematic diagram of a VFD circuit according to an embodiment of the invention.

Referring to FIG. 6, a VFD circuit 100 including overvoltage protection is shown according to another embodiment of the invention with the VFD circuit 100 having one potential implementation with the system 10 of FIG. 1, i.e., replacing VFD circuit 28, for example. The VFD circuit 100 is arranged similarly to the VFD circuit 60 of FIG. 5—and thus like elements therein are numbered identical to corresponding elements in VFD circuit 60—except that the rectifier bridge 66 in the VFD circuit 60 is replaced with a silicon controlled rectifier (SCR) bridge 102 that includes three SCRs 104, 106, and 108 therein. Because the VFD circuit 100 includes an SCR bridge 102, a pre-charge circuit 110 in VFD circuit 100 takes a different arrangement. The pre-charge circuit 110 in the VFD circuit 100 includes three diodes 112, 114, 116 and three resistors 113, 115, 117—one for each phase of the AC input 62—that are coupled with the EMI filter 64. In series with the three diodes 112, 114, 116 and three resistors 113, 115, 117 are three pre-charge relays 118, 120, and 122, with a relay being provided for each phase. In series with each of the three pre-charge relays 118, 120, 122 is a resistor 124, 126, 128, and the output of each resistor 124, 126, 128 is provided to the gate of a respective SCR 104, 106, 108. The three pre-charge relays 118, 120, 122 also converge at a node 130 by which the three pre-charge relays 118, 120, 122 are coupled in series with an overvoltage relay 132. The overvoltage relay 132 is coupled to the DC link 72 at a node 136.

The controller 88 in VFD circuit 100 is in operable communication with the pre-charge circuit 110 in order to provide for controlling thereof, with the controller 88 receiving an input from one or more voltage sensors 90 provided on the DC link 72 that measure the DC link voltage thereon. Based on values of the DC link voltage provided from sensors 90, the controller 88 then controls switching of each of the pre-charge relays 118, 120, 122 and the overvoltage relay 132 between an On state and an Off state, such that current through the pre-charge circuit 110 can be selectively controlled. More specifically, the overvoltage relay 132 allows current flow therethrough when in an "On" state/position and does not allow current flow therethrough when in an "Off" state/position, while the pre-charge relays 118, 120, 122 direct current flow therethrough to the overvoltage relay 132 (while providing an initial pre-charge of the DC link capacitor bank 78 via resistors 113, 115, 117) when in an "On" state/position and diverts current away from the overvoltage relay 132 when in an "Off" state/position—such that current flows therethrough and directly to the DC link capacitor bank 78.

In controlling operation of the pre-charge relay 118, 120, 122 and the overvoltage relay 132, the controller 88 compares the DC link voltage, as measured by voltage sensors 90, to a number of pre-defined "conditions" or "states" in which the VFD circuit may currently be operating. In an exemplary embodiment, the controller 88 compares the DC link voltage to a pre-defined "Overvoltage Condition," "Undervoltage Condition" (i.e., "Pre-Charge Condition") and "Normal Voltage Condition"—with it being understood that each of these conditions may encompass a pre-defined voltage range that the measured DC link voltage may fall within.

The states of the pre-charge relays 118, 120, and 122 and the overvoltage relay 132—as determined by the comparison of the DC link voltage to the pre-defined voltage conditions performed by controller 88—will now be described. When the pre-charge relays 118, 120, and 122 are in the On state and the overvoltage relay 132 is in the On state ("Undervoltage Condition"), the DC link 72 provides power to the DC link capacitor bank 78 through the resistors 113, 115, 117 during a pre-charge condition (start up). When the pre-charge relays 118, 120, and 122 are in the On state, and the overvoltage relay 132 is in the Off state ("Overvoltage Condition"), the DC link 72 does not provide power to the DC link capacitor bank 78, so as to remove or prevent an overvoltage condition. When the pre-charge relays 118, 120, and 122 are in the Off state and the overvoltage relay 132 is in either the On or Off state ("Normal Condition"), the DC link 72 provides power to the DC link capacitor bank 78 during a normal operating condition. Operation of the pre-charge circuit 110 is explained in greater detail in the technique illustrated in FIG. 8.

Figure 7:
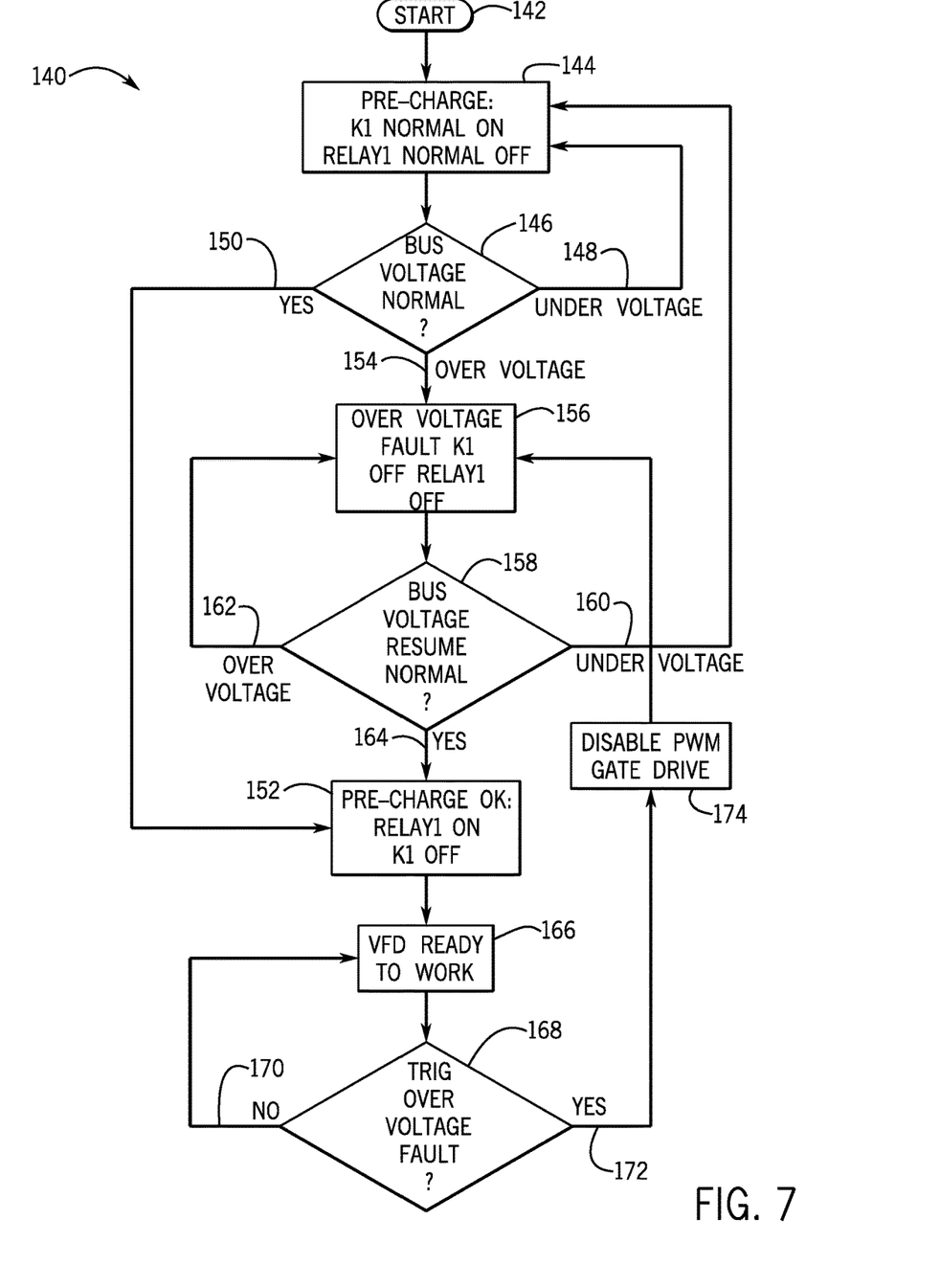
FIG. 7 is a flowchart illustrating a technique for controlling the VFD circuit of FIG. 5 according to an embodiment of the invention.

Referring to FIG. 7, and with reference back to FIG. 5, a technique 140 for controlling the VFD circuit 60 is shown, with the technique being performed by a controller in or associated with the VFD circuit 60, such as controller 88 according to an exemplary embodiment. The process 140 starts at STEP 142 when power is input into the VFD circuit 60—such as at start-up of the VFD circuit. At STEP 144, the controller 88 causes the pre-charge circuit 76 to initially operate in a pre-charge mode of operation, such that the pre-charge relay 82 (Relay1 in FIG. 7) is in the Off state and the overvoltage relay 86 (K1 in FIG. 7) is in the On state. While still in the pre-charge mode of operation, a determination is made at STEP 146 regarding whether the DC link voltage on the DC link 72 is in/at a Normal Voltage Condition, Undervoltage Condition or Overvoltage Condition—i.e., whether the DC link voltage is at a normal/undervoltage/overvoltage value or within a normal/undervoltage/overvoltage range. The determination at STEP 146 is based on a comparison of a measured DC link voltage (as measured by voltage sensor(s) 90) to pre-defined Overvoltage/Undervoltage/Normal Voltage values or ranges.

If it is determined at STEP 146 that the measured DC link voltage is in an Undervoltage Condition, as indicated at 148, the technique returns back to STEP 144 with the controller 88 causing the pre-charge circuit 76 of VFD circuit 60 to continue to operate in the pre-charge mode. As indicated above, in the pre-charge mode, the controller 88 causes the pre-charge circuit 76 to operate with the pre-charge relay 82 in the Off state and the overvoltage relay 86 in the On state. If it is determined at STEP 146 that the measured DC link voltage is in a Normal Voltage condition, as indicated at 150, the technique continues at STEP 150 with the controller 88 causing the pre-charge circuit 76 of VFD circuit 60 to operate in a normal mode, as indicated at STEP 152. In the normal mode, the controller 88 causes the pre-charge circuit 76 to operate with the pre-charge relay 82 in the On state (and the overvoltage relay 86 in either the On or Off state). If it is determined at STEP 146 that the measured DC link voltage is in an Overvoltage condition, as indicated at 154, the technique continues at STEP 156 with the controller 88 causing the pre-charge circuit 76 of VFD circuit 60 to operate in an overvoltage mode. In the overvoltage mode, the controller 88 causes the pre-charge circuit 76 to operate with the pre-charge relay 82 in the Off state and the overvoltage relay 86 in the Off state.

After switching to the overvoltage mode of operation at STEP 156, the technique 140 continues with monitoring/measuring the voltage on the DC link 72 and then makes another determination at STEP 158 as to whether the DC link voltage is in/at a Normal Voltage Condition, Undervoltage Condition or Overvoltage Condition—i.e., whether the DC link voltage is at a normal/undervoltage/overvoltage value or within a normal/undervoltage/overvoltage range.

If it is determined at STEP 146 that the measured DC link voltage has altered to an Undervoltage Condition, as indicated at 160, the technique returns back to STEP 144 with the controller 88 causing the pre-charge circuit 76 of VFD circuit 60 to operate in the pre-charge mode—with the pre-charge relay 82 being in the Off state and the overvoltage relay 86 being in the On state. If it is determined at STEP 158 that the measured DC link voltage is in the Overvoltage condition, as indicated at 162, the technique returns back to STEP 156 with the controller 88 causing the pre-charge circuit 76 of VFD circuit 60 to continue to operate in the overvoltage mode—with the pre-charge relay 82 being in the Off state and the overvoltage relay 86 being in the Off state. If it is determined at STEP 158 that the measured DC link voltage is in the Normal Voltage condition, as indicated at 164, the technique continues to STEP 152 with the controller 88 causing the pre-charge circuit 76 of VFD circuit 60 to operate in a normal mode—with the pre-charge relay 82 being in the On state (and the overvoltage relay 86 being in either the On or Off state).

After switching to the normal mode of operation at STEP 152, the technique 140 continues at STEP 166 with a recognition that the VFD circuit 60 is ready for operation. A final determination can be made at STEP 168 as to whether an overvoltage fault should be triggered. If no overvoltage fault is triggered, as indicated at 170, the VFD circuit 60 will continue to operate (STEP 168) to generate an output power. Conversely, if overvoltage fault is triggered, as indicated at 172, the output of power from the VFD circuit 60 is terminated at STEP 174 via the disabling of a PWM gate drive, before the technique returns to STEP 156 with the pre-charge circuit 76 being operated in the overvoltage mode.

Figure 8:
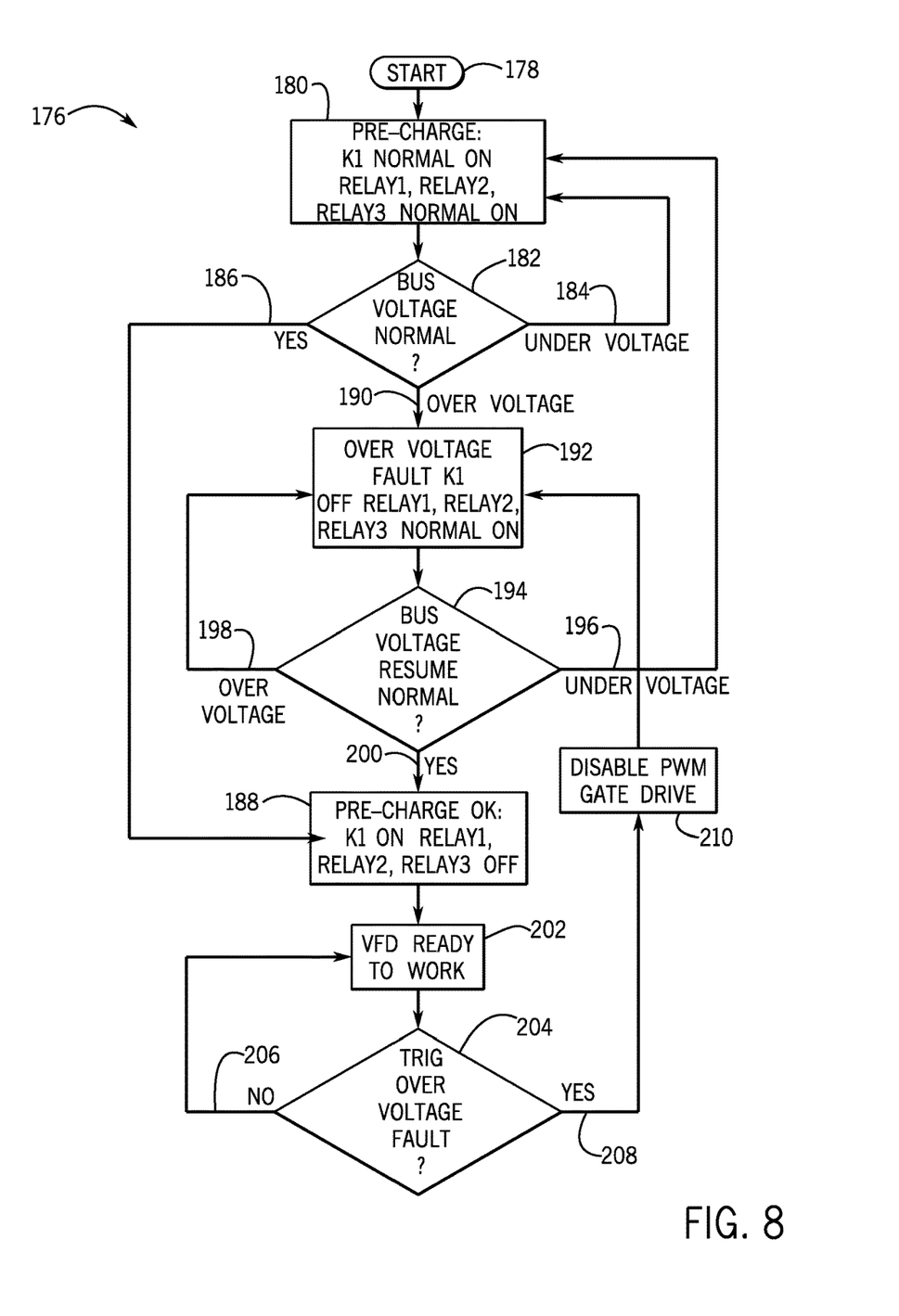
FIG. 8 is a flowchart illustrating a technique for controlling the VFD circuit of FIG. 6 according to an embodiment of the invention.

Referring now to FIG. 8, and with reference back to FIG. 6, a technique 176 for controlling the VFD circuit 110 is shown, with the technique being performed by a controller in or associated with the VFD circuit 110, such as controller 88 according to an exemplary embodiment. The process 176 starts at STEP 178 when power is input into the VFD circuit 110—such as at start-up of the VFD circuit. At STEP 180, the controller 88 causes the pre-charge circuit 110 to initially operate in a pre-charge mode of operation, such that the pre-charge relays 118, 120, and 122 (Relay1, Relay2, and Relay3 in FIG. 8) are in the On state and the overvoltage relay 132 (K1 in FIG. 8) is in the On state. While still in the pre-charge mode of operation, a determination is made at STEP 182 regarding whether the DC link voltage on the DC link 72 is in/at a Normal Voltage Condition, Undervoltage Condition or Overvoltage Condition—i.e., whether the DC link voltage is at a normal/undervoltage/overvoltage value or within a normal/undervoltage/overvoltage range. The determination at STEP 182 is based on a comparison of a measured DC link voltage (as measured by voltage sensor(s) 90) to pre-defined Overvoltage/Undervoltage/Normal Voltage values or ranges.

If it is determined at STEP 182 that the measured DC link voltage is in an Undervoltage Condition, as indicated at 184, the technique returns back to STEP 180 with the controller 88 causing the pre-charge circuit 110 of VFD circuit 100 to continue to operate in the pre-charge mode. As indicated above, in the pre-charge mode, the controller 88 causes the pre-charge circuit 110 to operate with the pre-charge relays 118, 120, and 122 in the On state and the overvoltage relay 132 in the On state. If it is determined at STEP 182 that the measured DC link voltage is in a Normal Voltage condition, as indicated at 186, the technique continues at STEP 188 with the controller 88 causing the pre-charge circuit 110 of VFD circuit 100 to operate in a normal mode, as indicated at STEP 188. In the normal mode, the controller 88 causes the pre-charge circuit 110 to operate with the pre-charge relays 118, 120, and 122 in the Off state (and the overvoltage relay 132 in either the On or Off state). If it is determined at STEP 182 that the measured DC link voltage is in an Overvoltage condition, as indicated at 190, the technique continues at STEP 192 with the controller 88 causing the pre-charge circuit 110 of VFD circuit 100 to operate in an overvoltage mode. In the overvoltage mode, the controller 88 causes the pre-charge circuit 110 to operate with the pre-charge relays 118, 120, and 122 in the On state and the overvoltage relay 132 in the Off state.

After switching to the overvoltage mode of operation at STEP 192, the technique 176 continues with monitoring/measuring the voltage on the DC link 72 and then makes another determination at STEP 194 as to whether the DC link voltage is in/at a Normal Voltage Condition, Undervoltage Condition or Overvoltage Condition—i.e., whether the DC link voltage is at a normal/undervoltage/overvoltage value or within a normal/undervoltage/overvoltage range.

If it is determined at STEP 194 that the measured DC link voltage has altered to an Undervoltage Condition, as indicated at 196, the technique returns back to STEP 180 with the controller 88 causing the pre-charge circuit 110 of VFD circuit 100 to operate in the pre-charge mode—with the pre-charge relays 118, 120, and 122 being in the On state and the overvoltage relay 132 being in the On state. If it is determined at STEP 194 that the measured DC link voltage is in the Overvoltage condition, as indicated at 198, the technique returns back to STEP 192 with the controller 88 causing the pre-charge circuit 110 of VFD circuit 100 to continue to operate in the overvoltage mode—with the pre-charge relays 118, 120, and 122 being in the On state and the overvoltage relay 132 being in the Off state. If it is determined at STEP 194 that the measured DC link voltage is in the Normal Voltage condition, as indicated at 200, the technique continues to STEP 188 with the controller 88 causing the pre-charge circuit 110 of VFD circuit 100 to operate in a normal mode—with the pre-charge relays 118, 120, and 122 being in the Off state (and the overvoltage relay 132 being in either the On or Off state).

After switching to the normal mode of operation at STEP 188, the technique 176 continues at STEP 202 with a recognition that the VFD circuit 100 is ready for operation. A final determination can be made at STEP 204 as to whether an overvoltage fault should be triggered. If no overvoltage fault is triggered, as indicated at 206, the VFD circuit 100 will continue to operate (STEP 202) to generate an output power. Conversely, if overvoltage fault is triggered, as indicated at 208, the output of power from the VFD circuit 100 is terminated at STEP 210 via the disabling of a PWM gate drive, before the technique returns to STEP 180 with the pre-charge circuit 110 being operated in the overvoltage mode.

Beneficially, embodiments of the invention thus provide a VFD circuit having built-in protections against VFD failures that can be caused by voltage notches in an AC power input and overvoltage ringing associated with such voltage notches—such as might be encountered with a "weak" power source with a high impedance, e.g., a 60 Hz diesel generator 12 in a drilling rig system. The VFD circuit includes an overvoltage protection relay that is added to an existing pre-charge circuit, with the overvoltage relay allowing for isolation of the DC link capacitor when an overvoltage condition is sensed on the DC link. In an exemplary embodiment, the overvoltage protection relay has only a small signal level and does not carry high current, such that no additional power source is required to switch the overvoltage relay between the on and off states beyond what is required for normal operation of the pre-charge circuit. The incorporation of the overvoltage protection relay into the pre-charge circuit of the VFD circuit provides a smaller and more cost effective solution for overvoltage protection than previous solutions for overvoltage protection.

Therefore, according to one embodiment of the invention, a VFD circuit includes an input connectable to an AC source, a rectifier connected to the input to convert an AC power input to a DC power, a DC link coupled to the rectifier to receive the DC power therefrom, the DC link having a DC link voltage thereon, a DC link capacitor bank comprising one or more capacitors connected to the DC link to smooth the DC link voltage, and a pre-charge circuit coupled to the DC link capacitor bank. The pre-charge circuit further includes one or more resistors, one or more pre-charge relays each operable in an on and off state to selectively control a current flow through the one or more resistors so as to control an initial pre-charge of the DC link capacitor bank, and an overvoltage relay operable in an on and off state to selectively cut-off a current flow to the DC link capacitor bank, so as to prevent an overvoltage condition in the DC link capacitor bank.

According to another embodiment of the invention, a method of operating a VFD circuit that includes a rectifier, a DC link having a DC link capacitor with one or more capacitors thereon, a pre-charge circuit, and an inverter is provided. The method includes receiving an AC power at an input of the VFD circuit and providing the AC power to the rectifier to covert the AC power to a DC power on the DC link, with the DC power comprising a DC voltage. The method also includes measuring the DC voltage via one or more voltage sensors on the DC link and comparing the measured DC voltage to a list of defined voltage conditions in order to identify a voltage condition on the DC link, the voltage conditions including an undervoltage condition, an overvoltage condition, and a normal voltage condition. The method further includes controlling the pre-charge circuit based on the identified voltage condition, wherein controlling the pre-charge circuit comprises selectively operating one or more pre-charge relays in the pre-charge circuit in an on state or an off state to control an initial pre-charge of the DC link capacitor bank and selectively operating an overvoltage relay in the pre-charge circuit in an on state or an off state to prevent an overvoltage condition in the DC link capacitor bank.

According to yet another embodiment of the invention, a VFD circuit includes a rectifier, a DC link coupled to the rectifier to receive a DC link voltage therefrom and having a DC link capacitor bank thereon that includes one or more capacitors, a pre-charge and protection circuit coupled to the DC link capacitor bank via the DC link and configured to control an initial pre-charge of the DC link capacitor bank and provide overvoltage protection to the DC link capacitor bank, and a controller in operable communication with the pre-charge and protection circuit. The controller is configured to receive an input from one or more voltage sensors regarding a measured DC link voltage and compare the measured DC link voltage to a number of defined voltage conditions in order to identify a voltage condition on the DC link, the defined voltage conditions comprising an undervoltage condition, an overvoltage condition and a normal voltage condition. The controller is further configured to control the pre-charge circuit based on the identified voltage condition so as to selectively provide for an initial pre-charge of the DC link capacitor bank and provide overvoltage protection to the DC link capacitor bank.

The present invention has been described in terms of the preferred embodiment, and it is recognized that equivalents, alternatives, and modifications, aside from those expressly stated, are possible and within the scope of the appending claims.

What is claimed is:

1. A variable frequency drive (VFD) circuit comprising:
an input connectable to an AC source;
a rectifier connected to the input to convert an AC power input to a DC power at an output thereof;
a DC link coupled to the rectifier output to receive the DC power therefrom, the DC link having a DC link voltage thereon;
a DC link capacitor bank comprising one or more capacitors connected to the DC link between the rectifier output and a DC side of an inverter to smooth the DC link voltage; and
a pre-charge circuit coupled to the DC link capacitor bank, the pre-charge circuit comprising:
one or more resistors;
one or more pre-charge relays each operable in an on and off state to selectively control a current flow through the one or more resistors, so as to control an initial pre-charge of the DC link capacitor bank; and
an overvoltage relay operable in an on and off state to selectively cut-off a current flow to the DC link capacitor bank, so as to prevent an overvoltage condition in the DC link capacitor bank.

2. The VFD circuit of claim 1 further comprising:
one or more voltage sensors to measure the DC link voltage; and
a controller that receives an input from the one or more voltage sensors regarding the measured DC link voltage, the controller being programmed to control the overvoltage relay and the one or more pre-charge relays based on the measured DC link voltage.

3. The VFD circuit of claim 2 wherein the rectifier comprises a six-diode bridge and the one or more pre-charge relays in the pre-charge circuit comprises a pre-charge relay; and
wherein the overvoltage relay is coupled in series with the one or more resistors and the pre-charge relay is coupled in parallel with the one or more resistors and the overvoltage relay.

4. The VFD circuit of claim 3 wherein the controller is programmed to:
compare the measured DC link voltage to a normal DC link voltage value;
operate each of the overvoltage relay and the pre-charge relay in the off state if the measured DC link voltage is greater than the normal DC link voltage value;
operate the overvoltage relay in the on state and the pre-charge relay in the off state if the measured DC link voltage is less than the normal DC link voltage value; and
operate the pre-charge relay in the on state if the measured DC link voltage is equivalent to the normal DC link voltage value.

5. The VFD circuit of claim 2 wherein the rectifier comprises a silicon-controlled rectifier bridge and the one or more pre-charge relays in the pre-charge circuit comprises three pre-charge relays, with a pre-charge relay being provided for each of three phases of the input.

6. The VFD circuit of claim 5 wherein the controller is programmed to:
compare the measured DC link voltage to a normal DC link voltage value;
operate the overvoltage relay in the off state and operate each of the three pre-charge relays in the on state if the DC link voltage is greater than the normal DC link voltage value;
operate the overvoltage relay and the three pre-charge relays in the on state if the measured DC link voltage is less than the normal DC link voltage value; and
operate the three pre-charge relays in the off state if the measured DC link voltage is equivalent to the normal DC link voltage value.

7. The VFD circuit of claim 5 wherein the silicon-controlled rectifier bridge comprises:
three silicon-controlled rectifiers; and
a resistor coupled to a gate of each of the three silicon-controlled rectifiers;
wherein each resistor and its associated silicon-controlled rectifier is in series with a respective one of the three pre-charge relays.

8. The VFD circuit of claim 5 wherein the pre-charge circuit further comprises a diode arranged in series with each respective pre-charge relay of the three pre-charge relays;
wherein the overvoltage relay is in series with all of the three pre-charge relays; and
wherein the one or more resistors is in series with the overvoltage relay.

9. The VFD circuit of claim 1 wherein the overvoltage relay has a small signal level and does not carry a high current, such that no additional power source is required to switch the overvoltage relay between the on and off states.

10. The VFD circuit of claim 1 further comprising an electromagnetic interference (EMI) filter positioned between the input and the rectifier; and
wherein the overvoltage relay, when in the off state, prevents failure of the DC link capacitor bank due to voltage notches present in AC power provided from the AC source and due to overvoltage ringing at input terminals of the rectifier.

11. A method of operating a variable frequency drive (VFD) circuit that includes a rectifier, a DC link, a pre-charge circuit, and an inverter, the method comprising:
receiving an AC power at an input of the VFD circuit;
providing the AC power to at least one of the rectifier and the pre-charge circuit to convert the AC power to a DC power having a DC voltage;
providing the DC voltage to the DC link and a DC link capacitor bank having one or more capacitors positioned on the DC link between an output of the rectifier and a DC side of the inverter;
measuring the DC voltage via one or more voltage sensors on the DC link;
comparing the measured DC voltage to a list of defined voltage conditions in order to identify a voltage condition on the DC link, the voltage conditions comprising:
an undervoltage condition;
an overvoltage condition; and
a normal voltage condition; and
controlling the pre-charge circuit based on the identified voltage condition, wherein controlling the pre-charge circuit comprises:
selectively operating one or more pre-charge relays in the pre-charge circuit in an on state or an off state to control an initial pre-charge of the DC link capacitor bank; and
operating an overvoltage relay in the pre-charge circuit in an on state or an off state to selectively cut-off current flow to the DC link capacitor bank, so as to prevent an overvoltage condition in the DC link capacitor bank.

12. The method of claim 11 further comprising providing the measured DC voltage to a controller in operable communication with the one or more voltage sensors and the pre-charge circuit, wherein the controller performs the comparing of the measured DC voltage to the list of defined voltage conditions and the controlling of the pre-charge circuit based on the identified voltage condition.

13. The method of claim 11 wherein the rectifier comprises a six-diode bridge rectifier and the one or more pre-charge relays in the pre-charge circuit comprises a single pre-charge relay; and
wherein controlling the pre-charge circuit comprises:
operating each of the overvoltage relay and the single pre-charge relay in the off state if the measured DC link voltage is in the overvoltage condition;
operating the overvoltage relay in the on state and the single pre-charge relay in the off state if the measured DC link voltage is in the undervoltage condition; and
operating the pre-charge relay in the on state if the measured DC link voltage is in the normal voltage condition.

14. The method of claim 11 wherein the rectifier comprises a silicon-controlled rectifier (SCR) bridge and the one or more pre-charge relays in the pre-charge circuit comprises three pre-charge relays; and
wherein controlling the pre-charge circuit comprises:
operating the overvoltage relay in the off state and operate each of the three pre-charge relays in the on state if the DC link voltage is in the overvoltage condition;
operating the overvoltage relay and the three pre-charge relays in the on state if the measured DC link voltage is in the undervoltage condition; and
operating operate the three pre-charge relays in the off state if the measured DC link voltage is in the normal voltage condition.

15. The method of claim 11 wherein the overvoltage relay is selectively operated without the use of an additional power source to switch the overvoltage relay between the on and off states.

16. The method of claim 11 wherein the overvoltage relay, when selectively operated in the off state, prevents failure of the DC link capacitor bank due to voltage notches present in the provided AC power and due to overvoltage ringing at input terminals of the rectifier.

17. A variable frequency drive (VFD) circuit comprising:
a rectifier having two output terminals;
a DC link coupled to the two rectifier output terminals to receive a DC link voltage therefrom, the DC link having a DC link capacitor bank thereon that includes one or more capacitors positioned between the two rectifier output terminals and a DC side of an inverter;
a pre-charge and protection circuit coupled to the DC link capacitor bank via the DC link and configured to control an initial pre-charge of the DC link capacitor bank and provide overvoltage protection to the DC link capacitor bank, the pre-charge and protection circuit comprising an overvoltage relay operable in an on state that allows current flow to the DC link capacitor bank and an off state that cuts-off a current flow to the DC link capacitor bank; and a controller in operable communication with the pre-charge and protection circuit, the controller configured to:

receive an input from one or more voltage sensors regarding a measured DC link voltage;

compare the measured DC link voltage to a number of defined voltage conditions in order to identify a voltage condition on the DC link, the defined voltage conditions comprising an undervoltage condition, an overvoltage condition, and a normal voltage condition; and control the pre-charge and protection circuit based on the identified voltage condition so as to selectively provide for an initial pre-charge of the DC link capacitor bank and provide overvoltage protection to the DC link capacitor bank.

18. The VFD circuit of claim 17 wherein the pre-charge and protection circuit comprises:

one or more resistors; and one or more pre-charge relays each operable in an on and off state to selectively control a current flow through the one or more resistors, so as to control the initial pre-charge of the DC link capacitor bank.

19. The VFD circuit of claim 18 wherein the rectifier comprises a six-diode bridge and the one or more pre-charge relays in the pre-charge and protection circuit comprises a single pre-charge relay; and wherein the controller is configured to:

operate each of the overvoltage relay and the single pre-charge relay in the off state if the measured DC link voltage is in the overvoltage condition;

operate the overvoltage relay in the on state and the single pre-charge relay in the off state if the measured DC link voltage is in the undervoltage condition; and operate the pre-charge relay in the on state if the measured DC link voltage is in the normal voltage condition.

20. The VFD circuit of claim 18 wherein the rectifier comprises a silicon-controlled rectifier bridge and the one or more pre-charge relays in the pre-charge and protection circuit comprises three pre-charge relays, with a pre-charge relay being provided for each of three phases of an input to the rectifier; and wherein the controller is programmed to:

operate the overvoltage relay in the off state and operate each of the three pre-charge relays in the on state if the DC link voltage is in the overvoltage condition;

operate the overvoltage relay and the three pre-charge relays in the on state if the measured DC link voltage is in the undervoltage condition; and operate the three pre-charge relays in the off state if the measured DC link voltage is in the normal voltage condition.

* * * * *